UNITED STATES PATENT OFFICE.

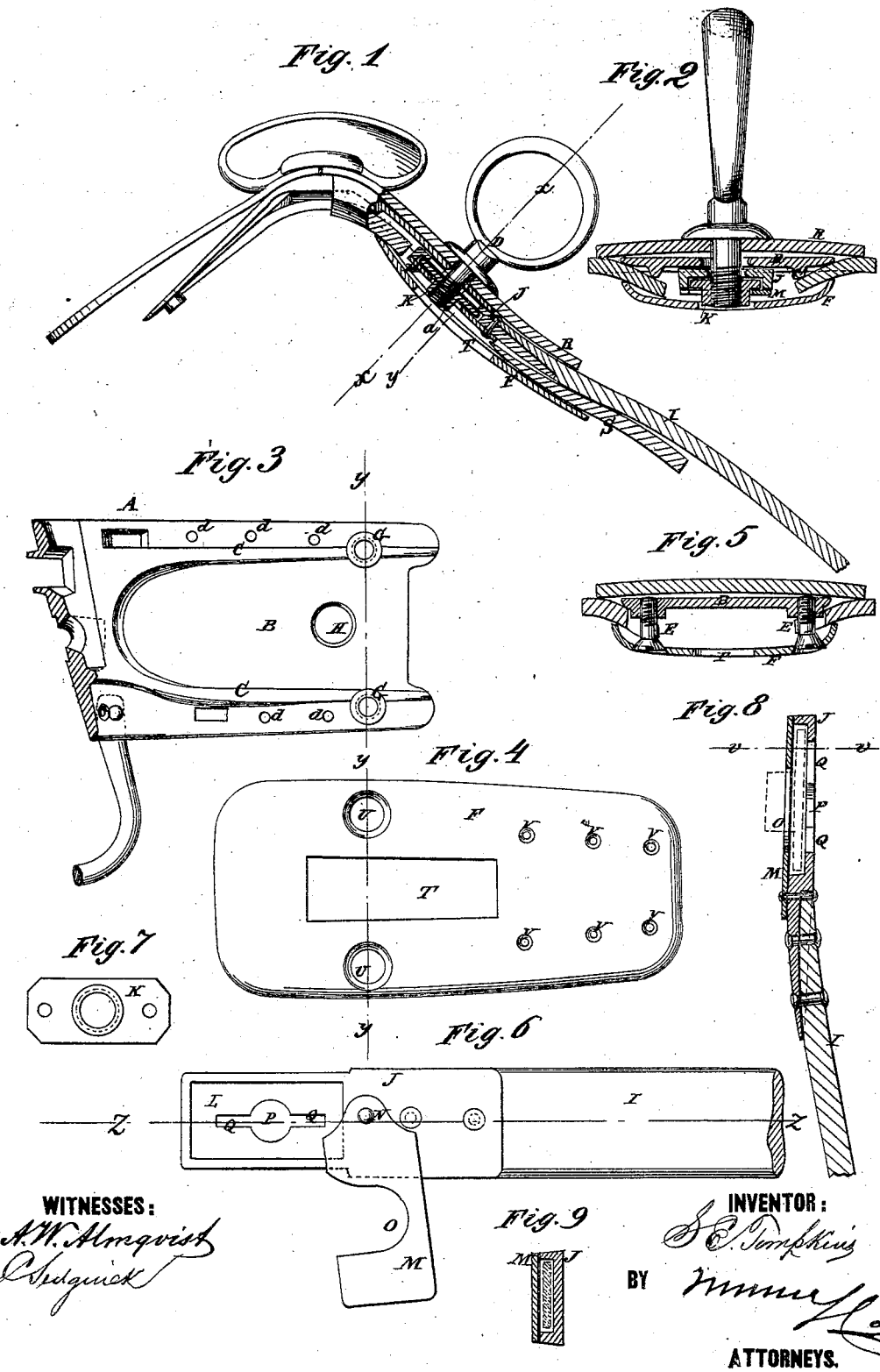

SAMUEL E. TOMPKINS, OF SING SING, NEW YORK.

IMPROVEMENT IN HARNESS-SADDLES.

Specification forming part of Letters Patent No. 152,191, dated June 16, 1874; application filed March 14, 1874.

*To all whom it may concern:*

Be it known that I, SAMUEL E. TOMPKINS, of Sing Sing, in the county of Westchester and State of New York, have invented a new and Improved Harness-Saddle, of which the following is a specification:

This invention has for its object an improved method of constructing harness-saddles so that the backbands and terret-nuts can be readily applied and removed after the saddle is completed, to allow of the application of terret-mountings to suit the fancy of the purchaser. It belongs to that class of saddles in which the tree is provided with a bridge, to which the nuts may be clamped by the terret-screws, so as to hold the backbands without being permanently attached, and which affords space between the tree and the under bearing for introducing the backbands, having the nuts connected to them, from the lower end. In this invention the essential features are a short tree with a bridge extending nearly the whole length of each side, having screw-holes in the margin, at the lower end, for use in certain kinds of saddles, for screwing on the under plate from the lower side; also nail-holes in the margin of a flat tree for fastening the flap when put on the top side; and also a metal plate attached to the upper end of the backband, having a socket for holding the terret-nut, and a covering-plate for the socket, to secure the nut without being fastened to the plate by rivets or screws, the covering-plate being pivoted at one end to the socket-plate, so as to swing forward and back to open and close the socket when the backband is not connected to the saddle, and be kept in place to secure the nut by the saddle when the backband is connected, and both the socket-plate and the covering-plate having openings for the terret-screw to pass through.

Figure 1 is partly a side elevation and partly a sectional elevation of my improved saddle, the section being taken on line $z\ z$ of Fig. 6. Fig. 2 is a transverse section on line $x\ x$ of Fig. 1. Fig. 3 is plan of one-half of the tree inverted. Fig. 4 is a plan of the under plate inverted. Fig. 5 is a transverse section on line $y\ y$ of Figs. 1, 3, and 4. Fig. 6 is a plan of a back-strap socket-plate and covering-plate inverted. Fig. 7 is a plan of a terret-nut. Fig. 8 is a longitudinal section of Fig. 6 on line $z\ z$, and Fig. 9 is a section of Fig. 8 on line $v\ v$.

Similar letters of reference indicate corresponding parts.

A represents the tree; B, the bridge between flanges or ribs C, said bridge extending the whole length of the side of the tree, or very nearly, the side being extended only as far down from the top as needed, for receiving the terret-mounting D, and screws E for fastening the under plate F immediately below the terret-screw, where holes G are provided for the screws E directly below the hole H for the terret-screws. I represents the backband; J, the metal socket-plate, attached to the upper end, for receiving and holding the terret-nut K in its socket L. M is the covering-plate for the socket. It is pivoted to the socket-plate at N to swing forward and backward over the socket, and has a notch, O, in one side to allow it to swing past the terret-screw. The socket-plate has a hole, P, and notches Q for the terret-screw and the flanges of the nut. The nut is placed in the socket, and covered by the plate M, and the backband is then shoved upward in its place in the saddle between the bridge and flap-tongue S—also between the ribs of the tree—till the terret-nut comes to the terret-screw, which is then screwed in, clamping the socket-plate firmly to the bridge. The covering-plate is prevented from swinging off from the socket, after the backband is introduced in the saddle, by the ribs of the tree. The under plate has a long slot, T, in it to make room for the projection $a$ of the nut to move up to its place. I also provide this tree with nail-holes $d$ in the margins, for nailing the flaps S, when placed on the top, which it is sometimes desirable to do in saddles of this kind. By this form of tree the holes U in the under plate are placed about as high up as the place where the terret-nut is usually fastened, and the screws E take the place of the terret-screws for fastening the under plate to the tree. The lower part of the under plate is fastened to the straps below the tree by nails driven through the holes V.

It will be seen that a terret-nut for any desired terret-mounting can be readily applied to the backband, and held without nails or screws. The covering-plate may be arranged in any approved way, and made in one or more parts.

Having thus described my invention, I claim as new and desire to secure by Letters Patent—

1. In a saddle-tree, whose sides terminate directly below the hole for the terret-screw, the holes G for the under-plate fastening-screws, located at or near the hole for the terret-screw, in combination with the slotted under plate, substantially as specified.

2. The under plate, containing slots, and having its fastening-screw holes U located near the upper end, and nail-holes V in the lower part, for fastening to the leather straps thereat, in combination with a tree whose sides terminate at or about the hole for the terret-screw, substantially as specified.

3. The under plate, having a slot, T, for the removal of the backband containing the terret-nut, substantially as specified.

4. The metal socket-plate J, in combination with the back-strap, for holding the terret-nut, substantially as specified.

5. The hinged covering-plate M, in combination with the metal socket-plate and the tree, for securing the terret-nut, substantially as specified.

6. A saddle-frame, flat on the upper surface, having the under plate secured independently of the terret, to allow the backband to be detachably connected, and provided with nail-holes $d$ in the margins for fastening the flaps when placed on the upper side.

SAM. E. TOMPKINS.

Witnesses:
A. P. THAYER,
T. B. MOSHER.